(12) United States Patent
Tamkin et al.

(10) Patent No.: US 8,570,356 B2
(45) Date of Patent: Oct. 29, 2013

(54) OPTICAL SYSTEM FOR DIRECT IMAGING OF LIGHT MARKABLE MATERIAL

(76) Inventors: John Michael Tamkin, San Marino, CA (US); John Michael Rodgers, Pasadena, CA (US); Matthew Scott Howarth, Clovia, CA (US); Richard Evans, Los Gatos, CA (US); Richard Hirst, Fakenham (GB)

( * ) Notice: Subject to any disclaimer, the term of this patent is extended or adjusted under 35 U.S.C. 154(b) by 675 days.

(21) Appl. No.: 12/477,874

(22) Filed: Jun. 3, 2009

(65) Prior Publication Data

US 2010/0309279 A1  Dec. 9, 2010

(51) Int. Cl.
*B41J 15/14* (2006.01)
*B41J 27/00* (2006.01)

(52) U.S. Cl.
USPC .......................................... 347/244; 347/258

(58) Field of Classification Search
USPC .......... 347/224, 225, 230, 244, 247, 255, 258
See application file for complete search history.

(56) References Cited

U.S. PATENT DOCUMENTS

| | | | | |
|---|---|---|---|---|
| 4,747,678 A * | 5/1988 | Shafer et al. | | 359/366 |
| 4,796,038 A | 1/1989 | Allen et al. | | |
| 5,258,777 A * | 11/1993 | DeJager et al. | | 347/258 |
| 5,645,680 A * | 7/1997 | Rietheimer | | 156/567 |
| 5,959,768 A | 9/1999 | Hutton | | |
| 6,047,755 A * | 4/2000 | Anderson et al. | | 156/351 |
| 6,084,706 A * | 7/2000 | Tamkin et al. | | 359/366 |
| 6,103,989 A | 8/2000 | Jennings et al. | | |
| 6,177,980 B1 | 1/2001 | Johnson | | |
| 6,243,210 B1 * | 6/2001 | Yan | | 359/641 |
| 6,257,294 B1 * | 7/2001 | Weisbeck | | 156/356 |
| 6,372,394 B1 | 4/2002 | Zientek | | |
| 6,476,962 B1 * | 11/2002 | Harrigan | | 359/354 |
| 6,640,713 B2 | 11/2003 | Landsman | | |
| 7,178,574 B2 * | 2/2007 | Nielsen et al. | | 156/542 |
| 7,317,470 B2 * | 1/2008 | Seibert | | 347/244 |
| 7,712,509 B2 * | 5/2010 | Constantine | | 156/582 |
| 7,837,823 B2 * | 11/2010 | Griffin et al. | | 156/277 |

FOREIGN PATENT DOCUMENTS

| | | |
|---|---|---|
| EP | 1566690 A1 | 8/2004 |
| JP | 2007-519525 | 7/2007 |
| KR | 10-0545362 | 1/2006 |
| KR | 10-2007-0018761 | 2/2007 |

* cited by examiner

*Primary Examiner* — Hai C Pham
(74) *Attorney, Agent, or Firm* — William A. Birdwell (57) ABSTRACT

An imaging system. An array of light sources and an array of lenses corresponding to the light sources and having optical axes substantially parallel to one another are provided. The lenses produce collimated output beams. An afocal optical relay having an optical axis substantially parallel to the optical axes of the lenses is also included, the array of lenses being positioned relative to the afocal optical relay so as to form an optical system that produces an image of each collimated output beam on an image plane, each image having a prescribed depth of focus and spot size. The light sources preferably are lasers producing an array of respective laser beams having high intensity and a long waist. A system for writing information on a light-sensitive label includes the imaging system. Methods of imaging and of writing information on a light-sensitive label are also provided.

11 Claims, 6 Drawing Sheets

OPTICAL SYSTEM FOR DIRECT IMAGING OF LIGHT MARKABLE MATERIAL

RELATED APPLICATIONS

This application is a continuation-in-part of U.S. patent application Ser. No. 11/511,103, filed Aug. 28, 2006, and published as U.S. Patent Publication No. 2007/0068630 on Mar. 29, 2007, which claimed priority to Provisional Patent Application No. 60/789,505, filed Apr. 4, 2006, and to Provisional Patent Application No. 60/712,640, filed Aug. 29, 2005, and was a continuation-in-part of U.S. patent application Ser. No. 11/069,330, filed on Mar. 1, 2005, now U.S. Pat. No. 7,168,472, which claimed priority to Provisional Patent Application No. 60/549,778, filed Mar. 3, 2004.

TECHNICAL FIELD

The embodiments of the present invention disclosed herein relate generally to the field of precision laser direct imaging of light markable media used in a printing application, and particularly to writing produce labels "on the fly," with variable, item-specific information, as the labels are about to be applied thereto.

BACKGROUND

Automatic labeling is of interest to the produce industry, in which it has become a common practice to label each item of produce with some item-specific information, printed in the form of, for example, text or a bar code. The information about the produce may include, for example, its type, size, date harvested, geographic origin, and whether or not the produce is organic. In particular, it has become desirable to label each item with a Price Look Up ("PLU") number, which enables retailers to facilitate quick handling and accurate pricing of produce at checkout. However, in the past, labeling items with different PLU numbers, for example, denoting "small," "medium," or "large" size designations for apples, has required three separate labeling machines, three separate label designs, and three label inventories. Consequently, it has become desirable to be able to apply variable, programmable, information "on the fly" to a produce label tailored to an individual item, thereby requiring only a single labeling machine and only a single, at least partially blank, label design. More background regarding this approach can be found at col. 1 line 11 through col. 2 line 45 of Hirst et al., U.S. Pat. No. 7,168,472, entitled Method and Apparatus for Applying Variable Coded Labels to Items of Produce, which issued Jan. 30, 2007 (hereinafter "Hirst"), the entire disclosure of which is hereby incorporated by reference herein, and at paragraphs 2-21 of Griffen et al., U.S. Patent Application Publication No. 2007/0068630, entitled Multi-Layer Markable Media and Method and Apparatus for Using Same, which was published Mar. 29, 2007 (hereinafter "Griffen"), the entire disclosure of which is also hereby incorporated by reference herein.

As disclosed in both Hirst and Griffen, it is desirable to write variable information directly onto a label using a light beam. To do this in a rapid, consistent, and cost effective manner presents challenges arising from the relationships between the labeling machine, label material, and light beam optics. In particular, it is desirable to provide a high power light beam so as to reduce the required label exposure time. It is also desirable to provide a light beam that has a long depth of focus at the label so as to ensure that a focused image will be written on the label despite potentially significant variations in the label position, relative to the nominal image surface of the light beam optics. It is further desirable to minimize aberrations in the light beam to provide, as nearly as practical, a diffraction limited light beam image at that image surface.

One method and apparatus for direct writing of a pattern with a laser beam is described in Tamkin, U.S. Pat. No. 6,084,706 (hereinafter "Tamkin"). Tamkin discloses a three-mirror afocal optical system in which the mirrors may have aspheric (e.g., parabolic, hyperbolic, or elliptical) or spherical surfaces. Such an all-reflective architecture, which uses mirrors instead of lenses throughout, achieves a high level of transmission efficiency compared to a lens-based system, in which the lens medium inevitably absorbs significant light energy at certain wavelengths.

In general, an afocal optical system is an optical system in which both the object and the image are assumed to be located at infinity. Light rays entering and leaving an afocal optical system are parallel. Examples include binoculars and telescopes, in which the image, although magnified by the optical system, is focused by the eye. Magnification may increase or decrease (i.e., fractionally magnify) the size of the image, depending on whether a magnification factor is greater than or less than one, respectively. An afocal optical system may be formed by combining two focal optical systems so that the rear focal point of the first system coincides with the front focal point of the second system, yielding an overall system that has no effective focal length. Several embodiments of a three-mirror afocal system are described in Tamkin, each having different magnifications.

In Tamkin, a single laser source and a beam splitter are used to produce up to eight separate beams, which are then passed through an optical system to produce a 15,000-pixel image, having pixel sizes in the range of about 1-10 microns. The three-mirror afocal system is then used to relay the scan beams with a desired magnification and minimal loss of power. However, splitting the power of a single laser into multiple scan beams greatly reduces the power that can be delivered per unit time to a given spot on an object, such as a label, thereby affecting the throughput of a direct scan system. In addition, Tamkin does not address the challenges of achieving the long depth of focus required in an automatic "on-the-fly" labeling system.

A multiple laser diode array may be used in a direct write application, rather than splitting a single laser into multiple beams, as disclosed in Landsman, U.S. Pat. No. 6,640,713. However, unless the laser diode array can be placed immediately adjacent the light markable medium, as is the case in writing produce labels on the fly, effective delivery of the laser light to the medium remains a challenge.

Johnson, U.S. Pat. No. 6,177,980 (hereinafter "Johnson"), discloses an optical system that couples an array of miniature lens elements, or lenslets, with an image projection system in a low resolution, large field microlithography application. Johnson modulates the expanded beam of a single diode laser source using a grating light valve or an array of micromirrors. The modulated light is then focused by an array of lenslets into widely spaced point images. The beam separation between the lenslets in Johnson is substantially wider than the focused spot, which requires a writing strategy that is not suitable for high-speed, in-line, web-fed processes. While Johnson discloses the use of an afocal system with an array of lenslets in a direct writing application, it does not address the aforementioned challenges that exist in the design of a direct write imaging system in which the position of the image plane may change significantly with time, the initial quality of the beam is poor, as in the output of a multi-mode diode laser, the illumination power of the beam must be high, and a physically compact, cost effective optical package is desirable.

Accordingly, there is a need for an improved optical system for photosensitive printing by direct writing with a laser beam on a light markable medium, wherein the position of that medium may vary significantly, the illumination power is high, and the optical system should be compact and cost effective.

SUMMARY

An imaging system is disclosed.

In a first respect the imaging system includes an array of light sources, an array of lenses corresponding to the light sources and having optical axes substantially parallel to one another. The lenses produce collimated output beams. An afocal optical relay having an optical axis substantially parallel to the optical axes of the lenses is also included, the array of lenses being positioned relative to the afocal optical relay so as to form an optical system that produces an image of each collimated output beam on an image plane, each image having a prescribed depth of focus and spot size.

In a second respect the imaging system includes an array of lasers, the array of lasers producing an array of respective laser beams. It further includes an array of lenses corresponding to, and disposed at a selected location relative to, the array of lasers so as to produce magnified images of the respective laser beams. An optical relay is disposed at a selected location relative to the array of lenses, so as to produce, at an image plane, images of the respective laser beams, wherein the images meet a selected blur criterion.

A system for writing information on a light-sensitive label is also disclosed. The system includes an array of light sources that produces an array of light beams, and an array of lenses corresponding to the light sources for directing the light beams toward an image plane. A labeling apparatus is provided for positioning the light-sensitive label at the image plane. An optical relay disposed between the source array and the labeling apparatus produces a magnified image of the light beams on the light-sensitive label so as to expose the label and thereby write a pattern thereon.

Methods of imaging and of writing information on a light-sensitive label are also disclosed.

It is to be understood that this summary is provided as a means for generally determining what follows in the drawings and detailed description, and is not intended to limit the scope of the invention. Objects, features and advantages of the invention will be readily understood upon consideration of the following detailed description taken in conjunction with the accompanying drawings

BRIEF DESCRIPTION OF THE DRAWINGS

Embodiments of the present invention will be readily understood from the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

As mentioned above, an advantage in using a direct-write laser system for creating product labels is that the label information may be changed "on-the-fly" according to variations in the product, such as size. For example, instead of sorting a batch of fruit by size prior to labeling, individual fruits may be labeled immediately after measuring. In an embodiment of the produce labeling method and apparatus of Hirst, referred to and incorporated herein by reference in its entirety, a label is acquired by a bellows from a strip of removable labels, exposed to a light beam that causes a pattern of light to be written through the label and onto the front surface of the label, and then applied by the bellows to an individual item of produce. (Hirst, FIGS. 1A and 1B; Hirst, col. 3, lines 45-59).

Such a method and apparatus, and the labels used therewith, present several challenges in the design of an optical system for writing on the label in the most effective way. One challenge arises because the longitudinal position of the label may vary significantly as the bellows rotates into position to apply the individual label onto the produce. Consequently, the consistency of the spot size written on the label depends, in part, on the depth of focus of the light beam and, in part, on the quality of the light beam. Another challenge arises because the beam of light is generally required to be of an intensity sufficient to expose the photosensitive media adequately. A further challenge is to produce an intense, high quality beam with a relatively long depth of focus in a physically convenient, cost-effective package.

Figure 1:
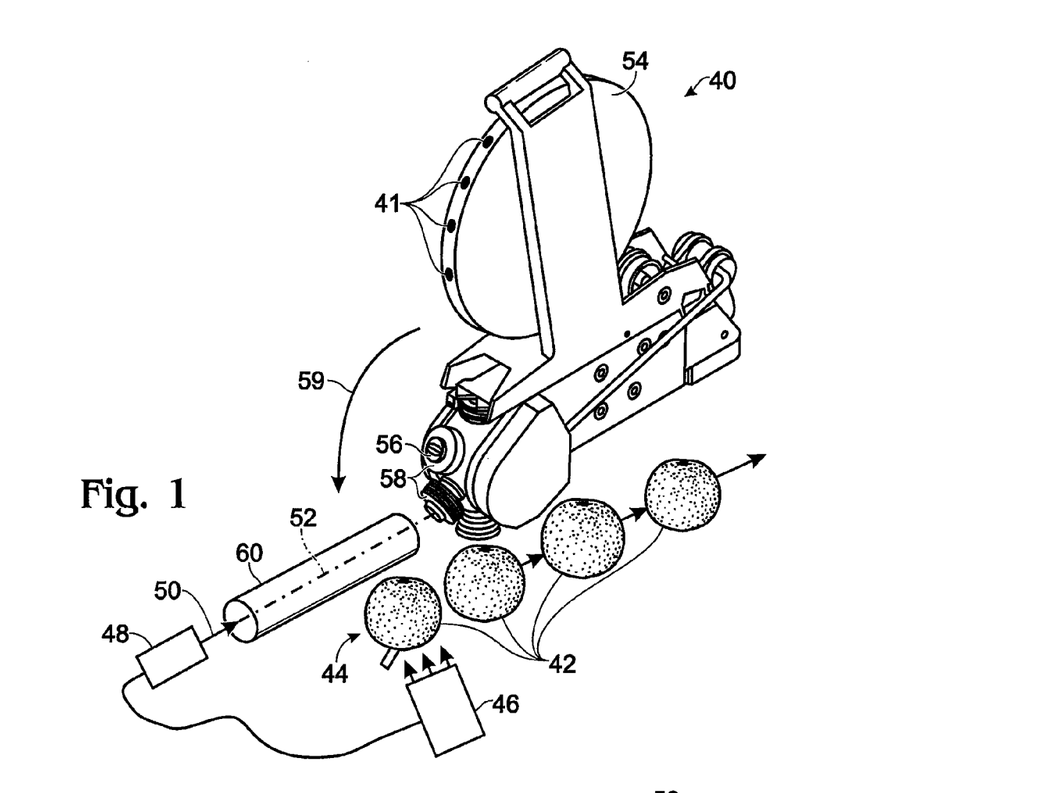
FIG. 1 is a perspective view of an automatic produce labeling apparatus in which a laser beam is used to write coded information on a multi-layer thermally-sensitive label.

Turning to FIG. 1, a labeling apparatus 40 is used to measure, and to immediately apply a label 41 to a product 42 being processed in a production line 44. In this example, size or other data about product 42 is gathered by a sensor 46, and transmitted to a laser coding device 48 that emits a laser beam 50 having an optical axis 52. Labeling apparatus 40 transfers an adhesive-backed blank label 41 from a roll 54 of blank labels 41 onto a bellows tip 56 of a rotary-mounted bellows 58. Upon acquiring label 41, bellows 58 holds the label 41 in place by maintaining low pressure at the interface between label 41 and bellows tip 56. As bellows 58 rotates along a curved path 59 toward production line 44, label 41, preferably of a multi-layer thermochromic type, passes through the optical axis 52 of laser coding device 48 and is exposed to laser beam 50. Laser beam 50 is directed to propagate through an optical conditioning device 60, such as a lens system shown schematically in FIG. 7. Optical conditioning device 60 conditions laser beam 50 so that it is suitable to accurately write coded label information directly onto label 41. As the rotary-mounted bellows 58 continues through its rotation, bellows 58 applies label 41 onto product 42, and repeats the cycle just described.

In a commercial application of such a produce-labeling system, a significant challenge is posed by the need for accurate timing, processing speed, and the need to focus an image accurately onto a moving target. For example, the labeling apparatus described in Griffen at paragraphs 114-120, the disclosures of which have been incorporated by reference above, is able to sustain a product throughput of 720 items of produce per minute. It is therefore desirable for the laser beam image projected onto label 41 to have a large depth of focus so that the image will remain in focus and retain its magnification throughout as much of the bellows' motion as possible, as indicated in FIGS. 6-8 and in paragraphs 63-64 of Griffen, the disclosures of which have been incorporated by reference above. However, some depth of focus may be sacrificed in favor of high power to expose the relatively large area of the label 41, which is about 20 mm wide. Characteristics of single laser diode sources or laser diode arrays suitable for use in such a produce labeling system are given, for example, in Griffen at paragraphs 0119 and 0120. They include wavelengths between 800 and 1600 nm and power levels of about 500 mW per laser diode.

Figure 2:
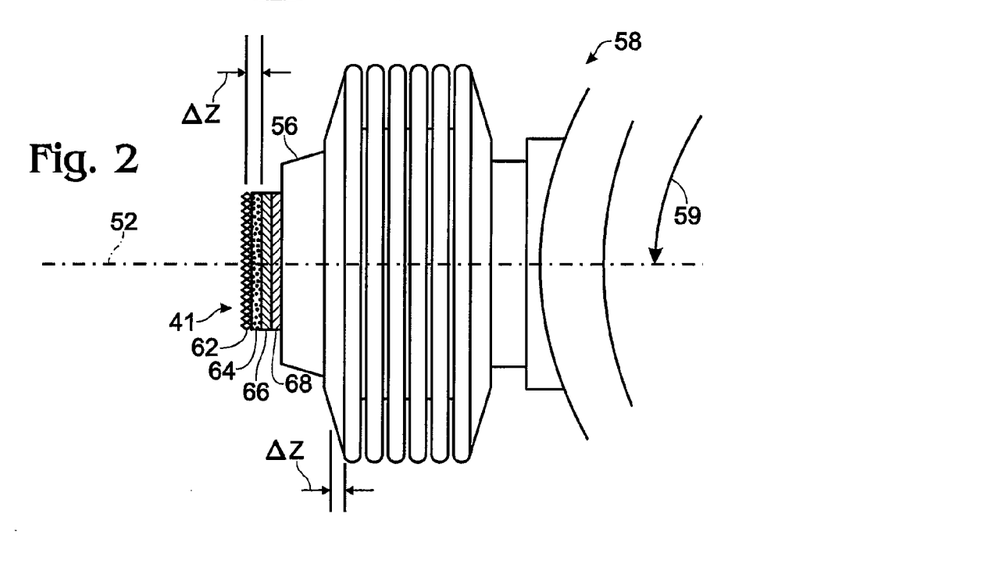
FIG. 2 is a side view of a portion of a bellows with a label attached thereto and aligned with the optical axis of a preferred embodiment of the optical system disclosed herein.

As shown in FIG. 2, the bellows 58 in an automated labeling system as described above, and in Hirst, FIGS. 1A-1B, and in Griffen, FIGS. 6-8, has a bellows tip 56 that pneumatically attaches to a light-sensitive label 41, acquires it from a backing material (not shown), moves it through the optical axis 52 of the optical beam conditioner 60, and applies it to an item of produce, as previously explained. Griffen describes, in FIGS. 9A-9B, and in paragraphs 65-66, an example of a particularly advantageous embodiment of a light-sensitive label 41 that comprises a three-layer structure shown in FIG. 2, the disclosures of which have been incorporated by reference above. The label 41 preferably has a translucent adhesive coating 62, a back, translucent substrate layer 64, a middle, light absorbent layer 66, and a front, thermochromic layer 68, arranged in that order, such that when a beam of light illuminates the back of label 41 it passes through adhesive coating 62 and substrate layer 64 to absorbent layer 66, in which the radiant energy is transformed into heat, which then causes thermochromic layer 68 to change color wherever it is exposed to light from the back of the label. Such a complex, multi-layer label comprising different materials may itself be treated as an optical system characterized by a point spread function, separate from, and in addition to, a point spread function characterizing optical conditioning device 60. As the bellows 58 travels through the optical axis 52, the position of the label 41 along the optical axis 52 varies over time, primarily due to inconsistency in the radial extension of bellows 58, but also due to rotation of the bellows 58 along curved path 59, variation in the surface shape of label 41, and other factors. This variation in the position of label 41 is represented by $\Delta z$ in FIG. 2. Consequently, to write a sharp image on label 41 consistently, the depth of focus of the optical system should be at least as long as $\Delta z$.

In addition to the disclosures of Hirst and Griffen, incorporated by reference in their entirety, including those particular sections cited above as, the present disclosure comprises a novel optical system design that performs the functions of laser coding device 48 and optical conditioning device 60 and the combination of that optical system with automatic produce labeling apparatus 40. The optical system comprises a laser diode source array that generates an array of laser beams, a microlens array that individually collimates the laser beams, and an afocal optical relay that conditions the laser beams and produces laser spots that meet the requirements of a particular application such as the produce labeling application.

Figure 3:
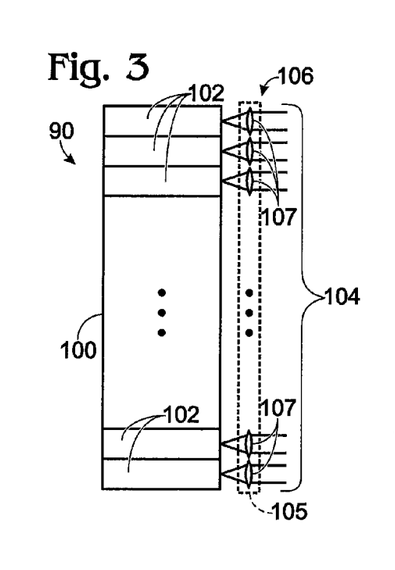
FIG. 3 is a schematic side view of an array of laser beams produced by a source array of laser diodes and collimated by an array of microlenses.

FIG. 3 shows a close-up side view of a laser diode and microlens source array assembly 90. Source array assembly 90 comprises a light source array component 100 and a lens array component 105 spaced apart at a selected distance. Light source array component 100 includes a power supply (not shown), and, according to a preferred embodiment, an array of laser diodes 102 that produce an array of laser beams 104 propagating along substantially parallel axes. Laser diodes 102 are preferably addressable, programmable light sources, having output powers that may be individually modulated by varying the current supplied to each diode in the array. Laser light produced by source array 100 preferably has a laser wavelength of about 980 nm, the nominal output power level of each of about 300 laser diodes 102 is about 500 mW, and laser diodes 102 are spaced apart by about 125 microns. Laser diode arrays of the type described herein can be obtained, for example, from OSRAM Opto Semiconductors, Inc. of Sunnyvale, Calif. and Laser 2000 GmbH in Munich, Germany. Lens array component 105 preferably comprises a collimating microlens array 106, the elements of which are individual lenslets 107 having substantially parallel optical axes, the lenslets 107 thus producing a collimated array of laser beams 104.

Figure 4:
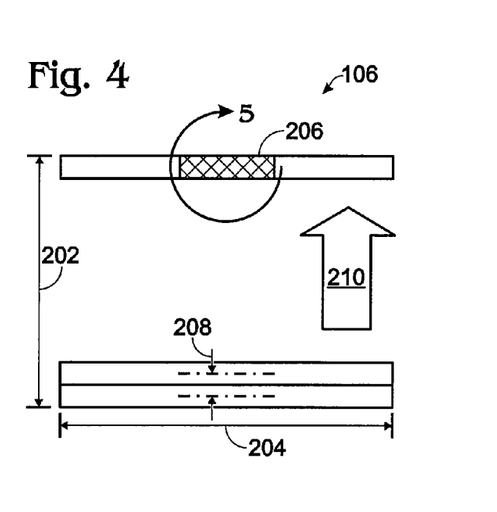
FIG. 4 is a schematic end view showing the geometry of custom-fabricated microlens array of FIG. 3.
Figure 5:
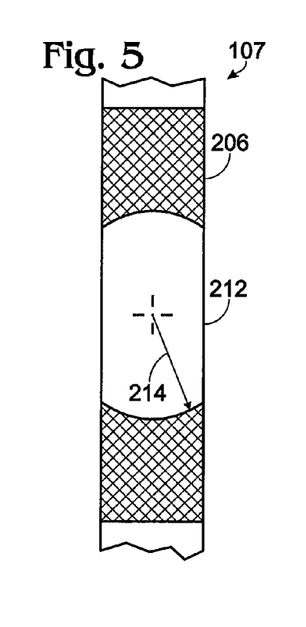
FIG. 5 is a detailed end view of a lens portion of a single lenslet within the microlens array shown in FIG. 3

FIG. 4 shows an end view of a preferred embodiment of a customized microlens array 106, having an array length 202 of about 35 mm and an array width 204 of about 5 mm. Microlens array 106 is a custom-fabricated device manufactured by companies such as Rochester Photonics Corporation of Corning, N.Y. Microlens array 106 is fabricated by construction of a repeating linear pattern of microlens array elements, or lenslets 107. Lenslets 107 are disposed adjacent to one another, with a center-to-center spacing distance 208 of about 125 microns, forming a one-dimensional, vertical row 210, of about 280 lenses. As shown in FIG. 5, which is an enlarged end view of a single microlenslet 107, centered within each lenslet 107 is an individual transparent microlens 212, having a lens diameter 214 of about 500 microns. Microlenses 212 may be replicated in polymer, solgel, or etched into the glass substrate. In a preferred embodiment, a pair of clear aperture (i.e., transparent), aspherical, convex, conic section polymer microlenses 212 are used to control aberrations, instead of using a unitary cylindrical lens design followed by a single-surface array, as is common in existing laser array systems.

Figure 6:
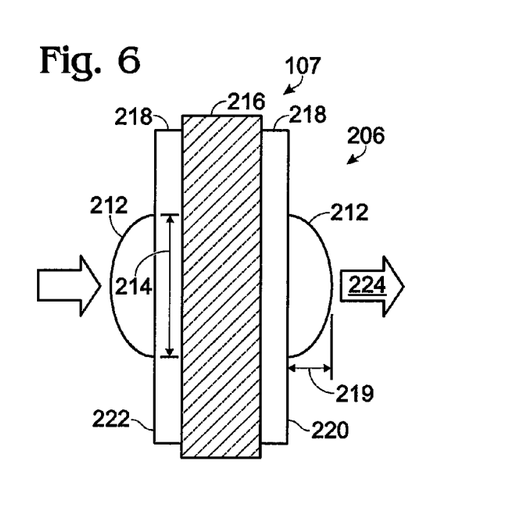
FIG. 6 is a cross-sectional side view of a single lenslet within the microlens array shown in FIG. 3.

FIG. 6 shows a single lenslet 107 in cross section. Lenslet 107 is fabricated on a fused silica (glass) substrate 216 about 1 mm thick, with an index of refraction of about 1.45. Flanking substrate 216 are two parallel photopolymer base layers 218, about 50 mm thick, with an index of refraction of about 1.54. Each polymer microlens 212 preferably has an aspheric, hyperboloid shape, and is formed so as to protrude laterally by a height 219 of about 40 microns from either a front surface 220, or a rear surface 222 of polymer base layer 218. At the center of each lenslet 107 in the vertical row 210, one bi-hyperboloid polymer lens 212 protrudes from front surface 220, and another lens 212 protrudes from rear surface 222. Thus, an individual laser beam 224 propagating from left to right in FIG. 6 at perpendicular incidence to the plane of the microlens array 106 passes through a pair of hyperboloid lenses 212, as well as through polymer base layers 218 and glass substrate 216 sandwiched between the lens pair.

Figure 7:
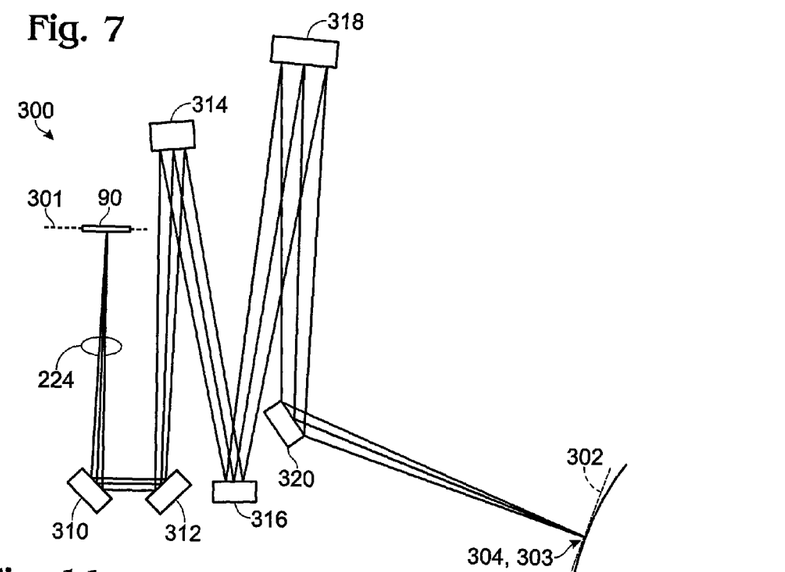
FIG. 7 is a layout diagram for a preferred embodiment of an optical system disclosed herein, showing example marginal rays from a single laser diode as they propagate through the system.

In FIG. 7, an all-reflective afocal optical relay system 300 is shown positioned between an object plane 301, at which the source array assembly 90 is positioned, and an image plane 302, which is co-located with a target label 303. Alternatively, while an all-reflective system is preferred to minimize power losses in transmission, it is to be understood that optical relay system 300 may be refractive, comprising lenses instead of mirrors, without departing from the broadest principles of the invention.

An output image 304, of the array of laser beams 104, is formed at the image plane 302, the image 304 comprising individual laser beam spots, each having a spot size 308. From a geometrical optics point of view, rays of light comprising each laser beam 224 produced by a given laser diode 102 of the source array 100, are collimated by a given lenslet array 107, and then the collimated beams propagate through a series of polished mirrors 310-320, some of which are powered, to produce a fractionally magnified output image 304 of the laser beam spot at image plane 302. Because the chief rays enter and leave the afocal optical relay system 300 parallel to the optical axis, the magnification does not change with defocus. The depth of focus is strictly determined by the wave optics characteristics of the focused laser spot at the final image plane. This is one advantage of the preferred system design shown.

As the rays comprising laser beam 224 propagate through optical relay system 300, they are deflected by each of mirrors 310-320 along a folded optical path, according to the law of reflection, which dictates that the angle of reflection equals the angle of incidence with respect to a normal to the surface of the mirror at the point of reflection. The first two mirrors shown, 310 and 312, are preferably flat mirrors, neither concave nor convex. Therefore they do not alter the profile of beam 224; rather, they direct the beam into the tilted mirror system. Mirrors 314, 316, and 318 are preferably spherical powered mirrors comprising a three-mirror afocal system 319. A three-element afocal system is used instead of a two-element system to further control aberrations. An output mirror 320 is preferably a flat mirror, angled so as to direct conditioned laser beam 224 toward target label 303 at the image plane 302. Mirrors 314-318 may be aspheric when the reduction ratio becomes large, causing the NA to exceed 0.05. The three-mirror system 319 serves to minimize aberrations so that the system performance remains diffraction-limited, rather than aberration-limited.

Figure 8:
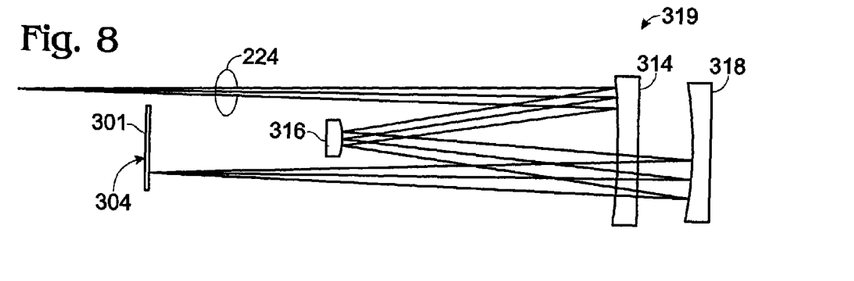
FIG. 8 is an unfolded side view of the optical system of FIG. 7, showing only the three powered mirrors, in which concave surfaces of the first and third mirrors, and a convex surface of the second mirror, are visible.

Referring to FIG. 8, which shows an unfolded, front view of the three-mirror afocal system 319, in a preferred embodiment, a first mirror 314 and a third mirror 318 are preferably positive powered mirrors which increase the size of output image 304; mirror 316 is preferably a convex, negative powered mirror which decreases the size of output image 304. Mirrors 314-318 thus cooperate to condition the laser beam 224 to produce the desired output image 304, having a desired spot size 308. A principal characteristic of the optical system design that includes microlens array 106 is to remove the punctile nature of laser diode emission, relative to the array element spacing, thereby causing each of the laser beams 224 to diverge enough that overlapping spots are formed on the image plane 302. Microlens array 106 effectively reduces the numerical aperture (NA) of the output of each laser diode 102 by at least about a factor of 10, thereby relaxing constraints on the design of afocal optical relay system 300.

It is important to note that an afocal system maintains the magnification of the output image 304 even if the object plane 301 or the image plane 302 is shifted. This is important because, as the position of the bellows tip 56 shifts through the depth of focus, due to rotation, vibration, and other mechanical errors, the lateral position of the image will not change or become distorted during the direct write operation.

The final magnification of the output image 304 may be tuned by varying the relative positions of the mirrors within afocal optical relay system 300. A prescription for a suitable afocal optical relay system 300 is detailed in Table 1, and illustrated by FIG. 9.

TABLE 1

Prescription for afocal optical relay system 300.

| Optical Element | Position, mm | Radius of Curvature, mm |
|---|---|---|
| Object | infinity | N/A |
| 1$^{st}$ powered mirror | −190.97 | −80.78 (concave) |
| 2$^{nd}$ powered mirror | −86.54 | 21.19 (convex) |
| 3$^{rd}$ powered mirror | −159.42 | −156.67 (concave) |
| Image | infinity | N/A |

Figures 9, 10:
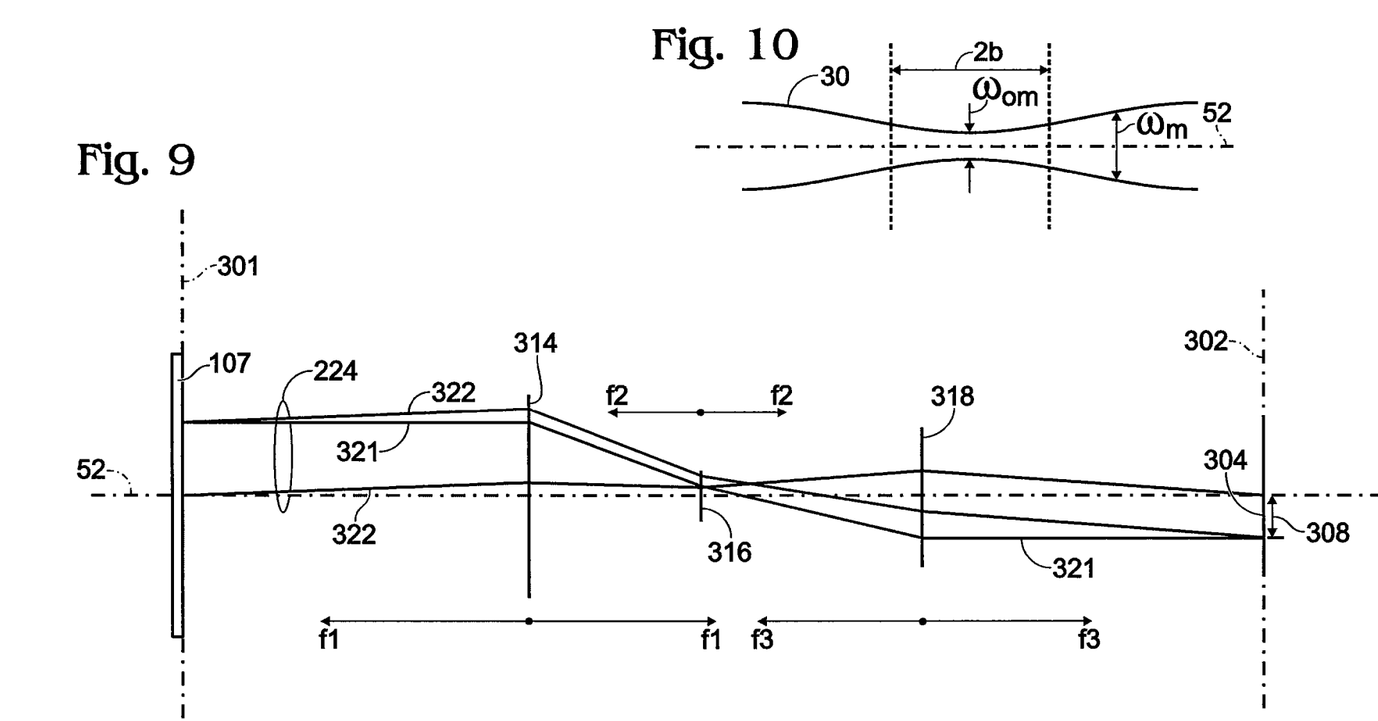
FIG. 9 is a thin lens schematic for the three-mirror afocal portion of the optical system of FIG. 7, showing chief and marginal rays emanating from a single, representative, laser diode at the center of the diode array, and propagating through the entire optical system.
FIG. 10 is a side view of a Gaussian laser beam profile showing the change in beam width with propagation.

In FIG. 9, an unfolded, reduced linear ray trace diagram of a laser beam 224 illustrates optical properties of the preferred embodiment in greater detail. FIG. 9 shows a thin lens representation of a lenslet 107 located at object plane 301, the first powered mirror 314 having focal length f1, the second powered mirror 316 having focal length f2, and the third powered mirror 318 having focal length f3, distributed in that order to output image 304, along the optical axis 52 of the optical conditioning device 60. Mirrors 314-318 form an afocal system; however, the object is not actually located at infinity.

FIG. 9 shows a chief ray 321 representing laser beam 224 that enters mirror 314 from the left, parallel to the optical axis 52, and exits from mirror 318 to the right, again parallel to the optical axis 52. Each such chief ray generated by each of laser diodes 102 then follows a path through the optical relay afocal system 300 like that of the representative chief ray 321 to the final image 304. A marginal ray 322 represents half of the extent of the width of laser beam 224. In a preferred embodiment, fractional magnification occurs, so the laser beam width at the entrance to the afocal system is greater than the laser beam spot size 308 at the output of the afocal system.

An important feature of the preferred embodiments disclosed herein is the positioning of the laser diode source array 100 with respect to the microlens array 106, so as to provide both the desired depth of focus and beam width at image plane 302, while also providing the maximum optical power. Lenslets 107 limit the amount of light collected from each laser diode 102, thus limiting the size of the laser beam 224 that exits each lenslet 107. At the same time, for use in on-the-fly label writing as described herein, and for other high speed imaging applications, it is important that the images of the laser beam spots corresponding to adjacent laser diodes 102 overlap at the image plane 302. This is to be able to produce continuously written areas on label 41, whereby any spaces between the written areas are the result of turning off one or more laser diodes 102. Without a microlens 212, the spot sizes on the facets of the laser diode source 102 are re-imaged onto the image plane 302. These spots, about several microns in diameter, are thus very small compared to the center-to-center lenslet spacing distance 208. Use of a microlens 212 "collimates" the beam from each laser, yielding larger spots, about the same size as the 125 micron center-to-center spacing distance 208. Since, as a practical matter, light from one laser diode source 102 should be captured by only one lenslet 107, the actual image spot size 308 is slightly smaller than the spacing distance 208, and the laser beams 224 exiting two adjacent lenslets 107 will not immediately overlap. However, adjacent laser beams 224 can be caused to overlap at some distance away from lenslet 107, because the laser beams 224 spread out as a function of distance (d) according to equation (1). Therefore, the image to be placed on image plane 302 is not that of the plurality of laser beams 224 directly exiting lenslets 107; rather, it is an image located at some distance away from the microlens array, at which adjacent laser beams 224 overlap sufficiently.

Turning to wave optics, FIG. 10 shows a more realistic representation of the shape of a beam of light that propagates through the optical system. It will be recognized by a person having skill in the art that the output of laser diode 102 ordinarily is a Gaussian laser beam 330, and that a lens or powered mirror of focal length f configured to collimate or focus Gaussian laser beam 330 produces a waist, or minimum width, $\omega_{om}$, at waist plane 332 in the image space of that lens or mirror. The laser beam width $\omega_m$ expands along the optical propagation axis 52 of laser beam 330 as a hyperbolic function of distance z from the waist $\omega_{om}$, such that the width is a function of the waist $\omega_{om}$, distance z, focal length f, wavelength $\lambda$, and a mode parameter M given by:

$$\omega_m(\lambda, \omega_{om}, z, M) := \omega_{om} \cdot \left[1 + \left(\frac{\lambda \cdot z \cdot M^2}{\pi \cdot \omega_{om}^2}\right)^2\right]^{.5} \quad (1)$$

The depth of focus is, then, a distance b in front of and in back of the waist $\omega_{om}$ within which an acceptable blur criterion is satisfied, as shown in FIG. 10. For a given laser beam waist $\omega_{om}$, the depth of focus b of the optical system is determined by the width of the laser beam $\omega_m$ and the mode content of the laser source, as described by its $M^2$ value. The depth of focus is thus independent of the position of the afocal relay system 300 relative to the diode lenslet source array assembly 90. In a preferred embodiment of the optical system disclosed herein, as used as used in the produce labeling application, a distance 2b, equal to twice the depth of focus, should exceed the variation in the label position, $\Delta z$, shown in FIG. 2.

Figure 11:
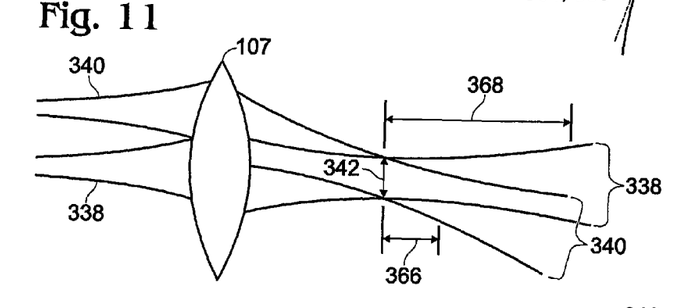
FIG. 11 is a wave optics illustration of the effect of multi-mode operation of a diode laser on the waist of a Gaussian beam produced by the laser when collimated by a lenslet.

FIG. 11 shows the effect of multi-mode operation of laser diode 102 on the laser beam width and consequently on the depth of focus, b, as Gaussian laser beam 330 passes through lenslet 107. With the use of beam optics, a laser beam 338 representing the central mode of Gaussian laser beam 330, and a laser beam 340 representing an edge mode of Gaussian laser beam 330, it can be seen that, as compared to single mode operation, in multi-mode operation ($M^2>1$), the expansion of the combined laser beam 366 occurs much more rapidly with distance z from the waist than does the expansion of a single laser beam 368, represented by arrows 342. This rapid expansion is accompanied by a corresponding shrinkage of the depth of focus b at the image plane 302. Preferably, the focal length of the lens is chosen to collect the most light from each diode 102. Since the center-to-center spacing distance 208 between array elements is fixed, a lens having a short focal length will collect more of the diverging light. However, a lens having a short focal length will also yield a narrow collimated output beam. Larger focal lengths produce larger spots, but if the focal length becomes too large, light spills over into adjacent array elements, causing too much overlap. Typically, the desired focal length would be that which matches the NA of the lenslet 107 to the divergence angle of the laser beam 224. However, these two competing goals are balanced to obtain the optimum focal length.

Figure 12:
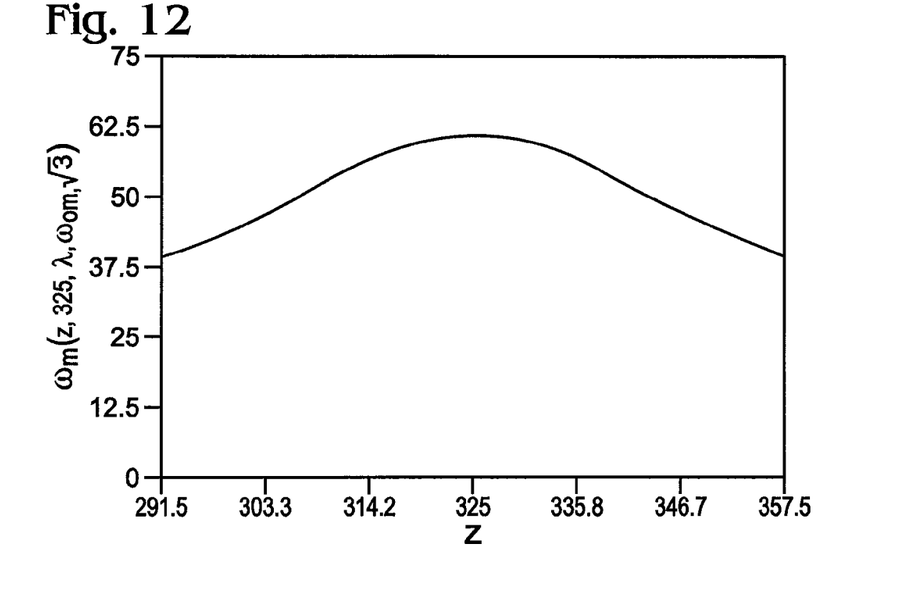
FIG. 12 is a plot of the width of a laser beam as a function of distance from a laser source.

According to Equation 2, the largest spot waist for an optimum focal length occurs when the laser source 100 is located at the front focus of microlens 312. If the focal length of microlens 312 is chosen so that the NA of the lenslet 107 matches the divergence angle of laser diodes 102, then the laser beam width $\omega_m$ (which, at image plane 302 is effectively the image spot size 208) as a function of laser source position z is shown in the plot in FIG. 12. The laser diode source 102 need not be located at the front focus of the microlens 212, but according to Equation 2, the largest spot size 308 corresponding to the smallest focal length occurs when the laser diode source 102 is located at the front focus.

$$\omega_{om2}(zf, \lambda, \omega_{om}, M) := \omega_{om} \cdot \frac{1}{\sqrt{\left(1 - \frac{z}{f}\right)^2 + \left[\frac{\pi \cdot \left(\frac{\omega_{om}}{M}\right)^2}{\lambda \cdot f}\right]^2}} \quad (2)$$

Figure 13:
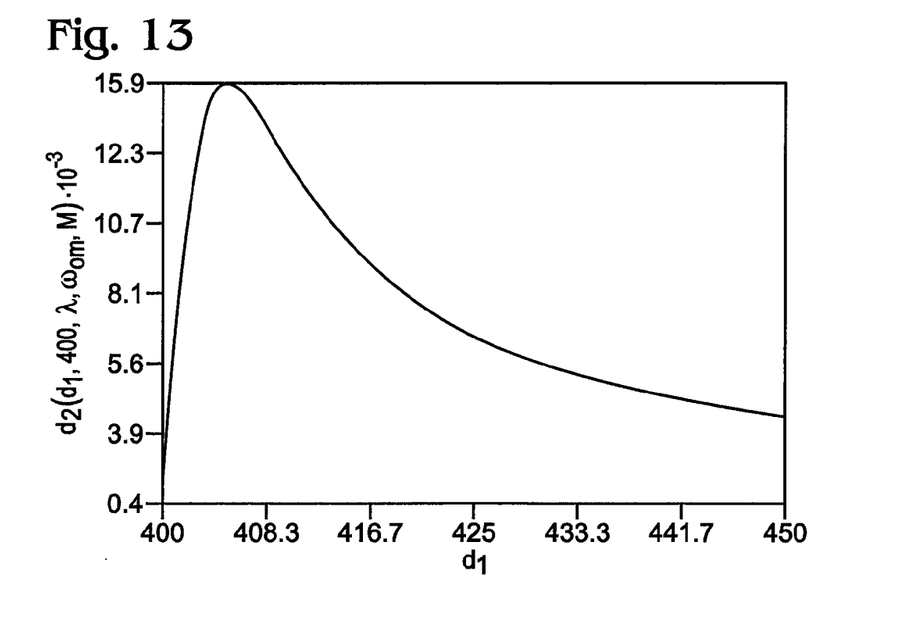
FIG. 13 is a plot of the location of an output waist of a laser beam as a function of the location of its input waist.

Each laser diode 102 could be placed so that the semiconductor facet that emits the laser light is positioned at the front focal point of its corresponding lenslet 107, and so that the waist $\omega_{om}$ of the laser beam 224 is at the back focal point of lenslet 107. However, this location is also the most sensitive to defocus errors. The output waist location $d_2$ as a function of the input waist location $d_1$ may be computed according to Equation 3, as is shown in FIG. 13:

$$d_2(d_1, f, \lambda, \omega_{om}, M) := \frac{f}{1 - \frac{d_1 \cdot f - f^2}{d_1^2 - d_1 \cdot f + \pi \cdot \frac{\left(\frac{\omega_{om}}{M}\right)^2}{\lambda}}} \quad (3)$$

In a preferred embodiment, the focal length of the microlens array 106 is slightly larger than the optimum focal length used in Equation 2 to obtain the data of FIG. 12, and the focal plane location of the laser beam is not located at the front focus, which pushes the waist location at the output to be in the range of about 5 mm-15 mm from the front of microlens array 106. The laser beam then expands from there so that adjacent beams 224 overlap at some distance away from the lenslet. The image of the laser beam spots is then transferred to the image plane 302 by the afocal optical relay system 300.

Output image 304 of laser diodes 102 has a predetermined magnification that is selected to satisfy the pixel pitch requirement of the direct-write application. This is illustrated by way of an example, in which thermochromic target label 303 is positioned for marking at image plane 302, and a bar code marking width of 18 mm is needed, with a desired image pixel spacing of about 70 microns. Given that laser beam 224 diverges by about 5-10 degrees at full width, half maximum (hereinafter "FWHM") as it propagates through microlens array 106, its Gaussian beam radius at the output of the microlens array 106 is about 62 microns. This translates to a FWHM laser beam spot size 308 at the output of the microlens array 106 of about 73 microns. The overall magnification of the afocal optical relay system 300 is given by the ratio of the image pixel spacing (70 microns) to the laser diode array pitch, in this example, (about 125 microns), yielding a factor of 0.562. Applying this factor to the FWHM laser beam spot size yields a final output laser beam spot size 308 of 41 microns.

Figure 14:
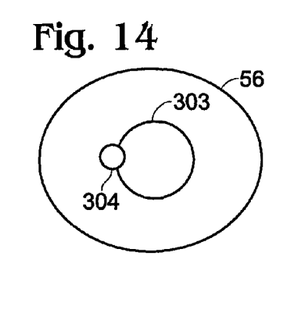
FIG. 14 is a pictorial view illustrating mis-alignment of a laser beam spot with respect to a target label.
Figure 15:
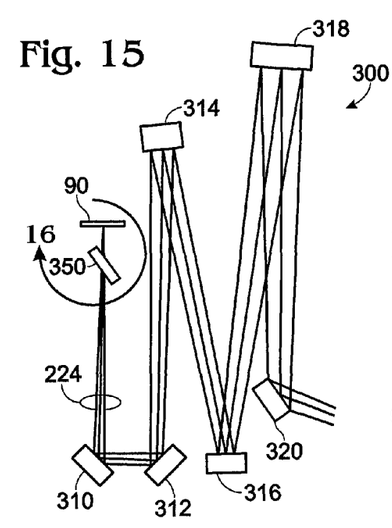
FIG. 15 is a reproduction of the optical layout diagram of FIG. 7, further showing placement of a label edge sensor at the input to an afocal optical relay.
Figure 16:
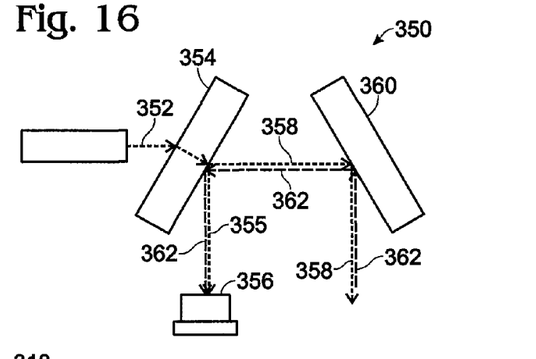
FIG. 16 is a schematic of a dichroic beamsplitter within the label edge sensor of FIG. 15.

Referring to FIGS. 14-16, a label edge sensor 350, shown in FIGS. 15 and 16 may be provided for detecting proper centering of the laser beam output image 304, as shown in FIG. 14, in which output image 304 has final output laser beam spot size 308, with respect to target label 303 positioned on bellows tip 56. In a preferred embodiment, label edge sensor 350 may be inserted between microlens array 106 and the input to optical relay system 300. Turning to FIG. 16, label edge sensor 350 is preferably constructed using a red laser beam 352 that is reflected by multi-layer thermochromic target label 303. Red laser beam 352 is split using a 50% dichroic beamsplitter 354, so that half of the red light forms a reference signal 355 that is deflected by 90 degrees and directed toward a split detector 356. The other half of the red light forms a sensing signal 358 that is reflected by a flat mirror 360 so as to propagate alongside laser beam 224 throughout optical relay system 300. When sensing signal 358 encounters target label 303, it reflects and forms a return signal 362. Return signal 362 propagates anti-parallel to laser beam 224, back along the folded path of optical relay system 300 until it again meets flat mirror 360 and dichroic beam splitter 354, which cooperate to direct the return signal 362 into split detector 356. If sensing signal 358 and laser beam 224 are misaligned with respect to target label 303, at least a portion of sensing signal 358 will fail to encounter target label 303, thereby diminishing the intensity of return signal 362. When the intensity of return signal 362 is then compared with that of reference signal 355, a mismatch indicates misalignment of laser beam 224 on the target label 303.

Figure 17:
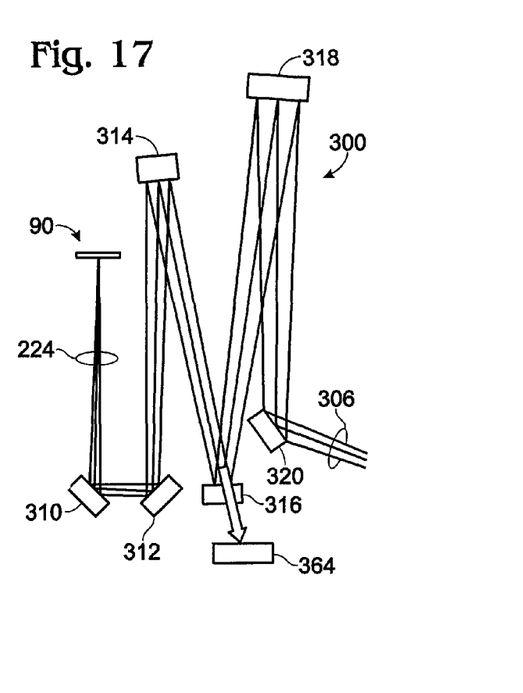
FIG. 17 is a reproduction of the optical layout diagram of FIG. 7, further showing placement of a detector for monitoring laser power during calibration of an afocal optical relay.

Referring to FIG. 17, a single power detector 364 for monitoring the power level of laser beam 224 may be added to afocal optical relay system 300. In a preferred embodiment, power detector 364 is placed behind second mirror 316, which may be specially designed to have partial transmission, thereby allowing a portion of the light from laser beam 224, ranging from 0.1% to 0.5%, to be sacrificed and directed into power detector 364.

Although certain embodiments have been illustrated and described herein, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A system for writing information on a light-sensitive label, comprising:
    a source array of light sources that produces an array of light beams;
    an array of rotationally symmetric lenses corresponding to the light sources for directing the light beams toward an image plane;
    a labeling apparatus for positioning the light-sensitive label at the image plane;
    an afocal optical relay, disposed between the source array and the labeling apparatus, producing a magnified image of the light beams on the light-sensitive label, so as to expose the label and thereby write a pattern thereon.

2. The system of claim 1, wherein said apparatus for positioning a light-sensitive label comprises a bellows having a bellows tip, the bellows holding the label in place by maintaining low pressure at an interface between the bellows tip and the label.

3. The system of claim 2, wherein the bellows is mounted on a rotatable support, acquires a label in a first position, and is rotated to a second, axial position along an optical axis of the optical relay so as to expose the label to the array of light beams.

4. The system of claim 3, wherein the bellows is further configured to be rotated to a third position and extended radially so as to apply the label to an item.

5. The system of claim 3, wherein the image has a depth of focus, the axial position of the label has a known variation, and the depth of focus of the image is selected to be at least as great as the variation in the axial position of the label.

6. The system of claim 5, wherein the light beams are linearly aligned along a first axis perpendicular to the optical axis, and the labeling apparatus moves the label through the optical axis along a second axis perpendicular to both the first axis and the optical axis while the label is exposed to the light beams.

7. The system of claim 6, wherein the light sources are modulated so that the patterns written on the label as it passes through the optical axis are bar codes.

8. The system of claim 1, wherein the optical relay has an optical axis and the apparatus for positioning the label is configured to move the label through the optical axis while being exposed to the light beams.

9. The system of claim 1, wherein the light sources are diode lasers operable at a laser wavelength, and the label has a three-layer structure in which a back layer comprises a material that is translucent at the laser wavelength; a middle layer absorbs light at the laser wavelength and converts light energy to heat; and a front, heat-sensitive, layer changes color in response to heat generated by the middle layer when, and at the locations where, the middle layer is illuminated by light transmitted through the translucent material.

10. The system of claim 1, wherein the light beams are laser beams, each of which has a waist located at a distance with respect to the array of lenses, and the optical relay is placed at a position such that images of adjacent beam waists overlap by a selected amount.

11. The system of claim 1, wherein the magnification of the magnified image is fractional.

* * * * *